(12) United States Patent
Crochet

(10) Patent No.: US 9,189,930 B2
(45) Date of Patent: Nov. 17, 2015

(54) CUSTOMIZING ALERTS ON AN ALERTING DEVICE

(71) Applicant: Verizon Patent and Licensing Inc., Basking Ridge, NJ (US)

(72) Inventor: Christopher J. Crochet, Riverview, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 130 days.

(21) Appl. No.: 13/971,331

(22) Filed: Aug. 20, 2013

(65) Prior Publication Data
US 2015/0054652 A1    Feb. 26, 2015

(51) Int. Cl.
| | |
|---|---|
| G08B 5/00 | (2006.01) |
| G08B 5/36 | (2006.01) |
| H04L 29/08 | (2006.01) |
| H04M 3/42 | (2006.01) |
| G06Q 10/00 | (2012.01) |
| G06Q 10/10 | (2012.01) |

(52) U.S. Cl.
CPC *G08B 5/36* (2013.01); *G06Q 10/00* (2013.01); *G06Q 10/107* (2013.01); *H04L 67/306* (2013.01); *H04M 3/42* (2013.01); *H04M 3/42051* (2013.01)

(58) Field of Classification Search
None
See application file for complete search history.

(56) References Cited

U.S. PATENT DOCUMENTS

| | | | |
|---|---|---|---|
| 7,262,707 B2 * | 8/2007 | Kaoh | 340/815.4 |
| 2008/0143517 A1 * | 6/2008 | Goffin | 340/540 |
| 2012/0108215 A1 * | 5/2012 | Kameli | 455/412.2 |
| 2014/0347179 A1 * | 11/2014 | Fleszewski et al. | 340/468 |

OTHER PUBLICATIONS

Matt Peckham, "Star Wars' Chewbacca Actor Fights TSA Over Lightsaber Cane", http://newsfeed.time.com/2013/06/11/star-wars-chewbacca-actor-fights-tsa-over-lightsaber-cane/, Jun. 11, 2013, 1 page.

* cited by examiner

*Primary Examiner* — Julie Lieu

(57) ABSTRACT

A first device may receive an alert from a second device; and execute, based on receiving the alert, a particular alerting program, of multiple alerting programs, to activate or deactivate multiple separate light sources, implemented within the first device, in a sequence in accordance with instructions included in the particular alerting program. The instructions may be selected or customizable by a user via an application associated with the first device. The first device may be separate from the second device.

20 Claims, 10 Drawing Sheets

Program Instructions Field 410

| Program ID: 1 |||||
|---|---|---|---|---|
| Audio: Star Wars.mp3 |||||
| Volume 5/10 |||||
| Time Index | LED 1 | LED 2 | LED 3 ||
| 0:01 | Blue | Blue | Blue ||
| 0:02 | Red | Red | Red ||
| 0:03 | Off | Blue | Off ||
| 0:04 | Red | Off | Red ||

Program Selection Field 420

| | Alert Attributes ||||| |
|---|---|---|---|---|---|
| Alert Type | Interface Type | Telephone Number | Device ID | Program | Cycles |
| Telephone Call | Bluetooth | 555-555-1111 | Any | 1 | 5 |
| Text Message | Bluetooth | 555-555-2222 | Any | 2 | N/A |
| Resource Level Alert | Any | N/A | M2M123 | 3 | 7 |
| Temperature Alert | Wifi, Cellular | N/A | M2M456 | 4 | 6 |
| Time-Based Alarm | Local Storage | N/A | Local storage | 5 | N/A |

CUSTOMIZING ALERTS ON AN ALERTING DEVICE

BACKGROUND

User devices alert users, for example, when the user is receiving a telephone call, a text message, an e-mail message, or the like. Users may wish to customize the presentation of alerts based on the user's interest and preferences.

BRIEF DESCRIPTION OF THE DRAWINGS

FIG. 4 illustrates an example data structure that may be stored by one or more devices in the environment of FIG. 2;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide an alerting device that provides customized alerts based on the occurrence of an event.

Figure 1:
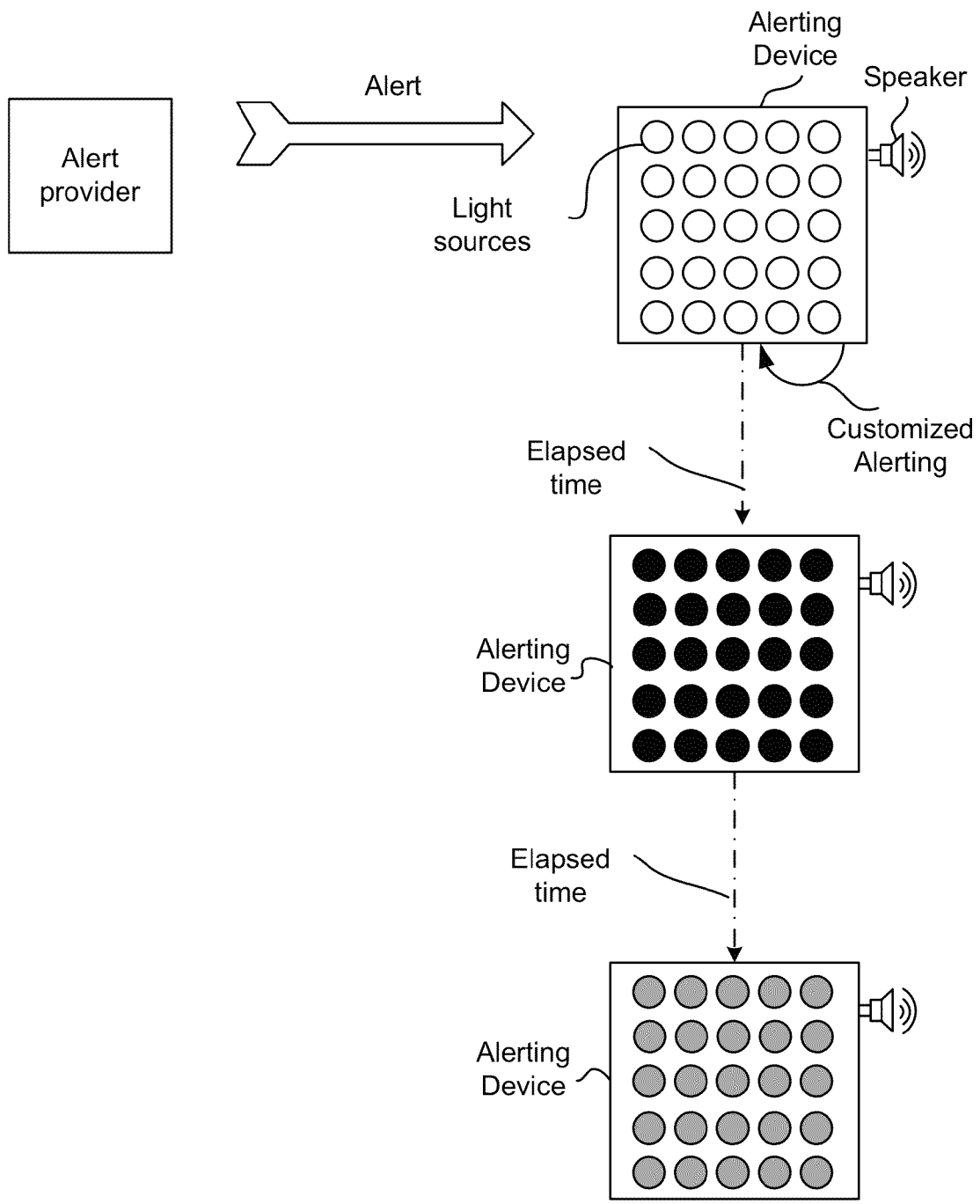
FIG. 1 illustrates an example overview of an implementation described herein.

FIG. 1 illustrates an example overview of an implementation described herein. As shown in FIG. 1 an alerting device may include one or more light sources (e.g., light emitting diodes (LEDs), florescent light bulbs, or the like). Additionally, the alerting device may include one or more speakers. In some implementations, the alerting device may be provided in a walking aid, such as a cane, a hiking stick, or the like. Additionally, or alternatively, the alerting device may be provided in a keychain, a belt clip, a paperweight, a monitor, etc.

In some implementations, the alerting device may execute a custom alerting program that causes the alerting device to activate the one or more light sources and/or output audio from the speaker. In some implementations, a user may generate the custom alerting program via a user interface of the alerting device to select particular audio to output and select particular light sources to activate in a particular sequence such that the light sources form a pattern and/or an animation.

As shown in FIG. 1, an alert provider may provide an alert that corresponds to the occurrence of an event. For example, an alert provider may correspond to a user device that provides an alert, such as an alert relating to an incoming telephone call, e-mail, text message, application alert, or the like. Additionally, or alternatively, the alert provider may correspond to a client device, such as a machine-to-machine (M2M) device, that determines the occurrence of an event based on information gathered by one or more sensors and/or meters of the client device.

Based on receiving the alert, the alerting device may execute a custom alerting program to activate one or more light sources, output audio, etc. In an example shown in FIG. 1, the alerting device may output audio, and may activate (e.g., power on) the lighting sources. As further shown in FIG. 1 and after additional time has elapsed, the alerting device may modify an intensity, color, and/or shading of the light output by light sources to complete a program cycle. In some implementations, the alerting device may repeat the program cycle, thereby creating an animation when alerting a user. In some implementations, the alerting device may discontinue the program cycle when the user provides an instruction to discontinue the program cycle (e.g., when the user answers a telephone call, when the user presses a silence button on the alerting device, etc.). Additionally, or alternatively, the alerting device may discontinue the program cycle after a predetermined number of cycles has completed.

As described above, the user may generate the custom alerting program via a user interface. In some implementations, the custom alerting program may include a program cycle that identifies particular light sources to activate or deactivate in a particular sequence, particular time indexes in which to activate or deactivate the particular light sources, a color/intensity of light output by the light sources, particular audio to output at the particular time indexes, and/or some other instruction for the alerting device. In some implementations, different custom alerting programs may be executed based on attributes associated with the alert provided by the alert provider. For example, the alerting device may execute a first custom alerting program when receiving an alert corresponding to an incoming call from a first telephone number. Further, the alerting device may execute a second custom alerting program when the alerting device receives an alert corresponding to an incoming call from a second telephone number. Additionally, the alerting device may execute a third custom alerting program when the alerting device receives an alert corresponding to an intrusion type alert. That is, the alerting device may store multiple custom alerting programs and may select a particular custom alerting program to execute based on attributes of the alert.

Figure 2:
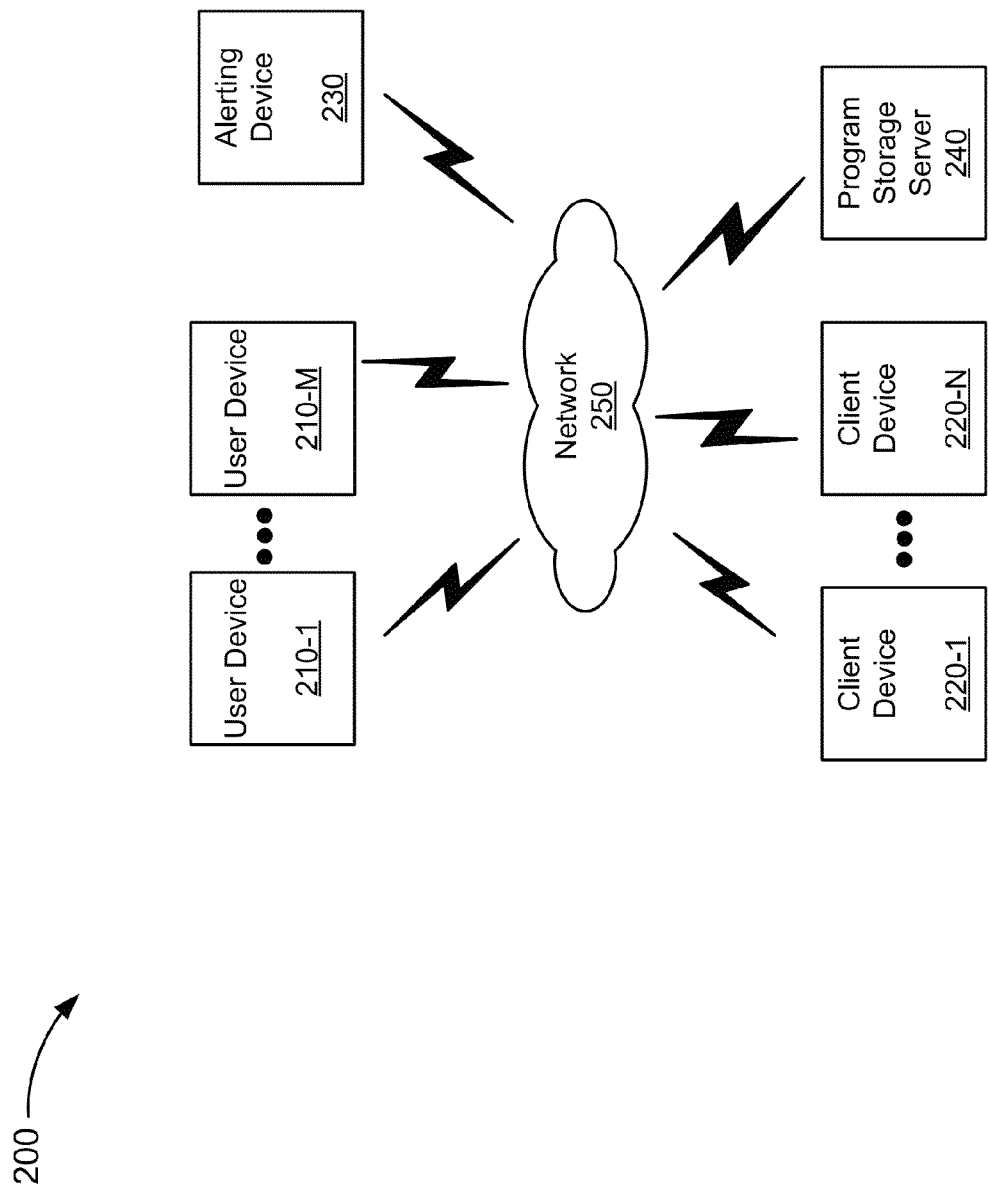
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), client devices 220-1, . . . , 220-N (where N≥1), alerting device 230, program storage server 240, and network 250.

User device 210 may include a device capable of communicating via a network, such as network 250. For example, user device 210 may correspond to a mobile communication device (e.g., a smart phone or a personal digital assistant (PDA)), a portable computer device (e.g., a laptop or a tablet computer), a desktop computer, a gaming device, a set-top box. In some implementations, user device 210 may correspond to an alert provider and may provide an alert to alerting device 230. For example, user device 210 may provide an alert relating to an incoming telephone call, e-mail, text message, application alert (e.g., an application notification, such as an alert from a social media application, a gaming application, etc.), or the like. In some implementations, user device 210 may be paired or connected to alerting device 230 so that user device 210 may provide alerting device 230 with alerts. In some implementations, user device 210 may output particular audio when providing an alert to alerting device 230 and/or user device 210 connects with alerting device 230.

In some implementations, user device 210 may be used to generate a custom alerting program for alerting device 230. For example, user device 210 may include an application that may be used to generate the custom alerting program. Additionally, or alternatively, user device 210 may communicate with program storage server 240 to generate the custom alerting program via an application programming interface (API) implemented by program storage server 240. Additionally, or alternatively, user device 210 may communicate with alerting device 230 to generate the custom alerting program via an API implemented by alerting device 230. In some implementations, user device 210 may be used to generate program selection instructions (e.g., instructions that direct alerting device 230 to select a particular custom alerting program based on alert attributes). In some implementations user device 210 may function as an alerting device 230 and/or as an alert provider. In some implementations, user device 210 may display a battery level indication to indicate the battery level of a connected alerting device 230, or other device to which user device can authenticate to either over a wired or wireless link.

Client device 220 may include one or more machine-to-machine (M2M) devices capable of communicating via a network. In some implementations, client device 220 may correspond to an alert provider to provide an alert to alerting device 230. In some implementations, client device 220 may include a network device (e.g., a modem, a switch, a gateway, etc.), a sensing device, a processing device, a metering device, and/or some other type of device. In some implementations, client device 220 may include a sensing or metering device to gather data and form a data record associated with the data. For example, a data record may include a temperature measurement, a resource usage measurement, a motion detection indication, an object detection indication, a facility intrusion detection indication, or some other measurement and/or indication. In some implementations, each data record may include a timestamp, information identifying a particular sensing/metering device of client device 220 used to gather the data in the data record, information regarding a particular product associated with the data, information regarding a particular facility associated with the data, information regarding a particular geographic location associated with the data, and/or some other information regarding the data.

In some implementations, data records may be used to provide an alert based on the occurrence of an event (e.g., a facility intrusion event, an event that identifies when resources have dropped below a particular threshold, and/or some other type of event).

Alerting device 230 may include a computing device that may execute a particular custom alerting program corresponding to attributes of a received alert. In some implementations, alerting device 230 may be implemented as or within a walking aid, such as a cane, a hiking stick, or the like. Additionally, or alternatively, alerting device 230 may be implemented as or within a keychain, a belt clip, a paperweight, a monitor, a picture frame, or the like. Additionally, or alternatively, alerting device 230 may be implemented in a wearable fabric. In some implementations, alerting device 230 may include multiple light sources, one or more speakers, and/or some other component that may be activated when executing a custom alerting instruction. In some implementations, alerting device 230 may implement an API via which user device 210 may generate the custom alerting program. Additional details regarding alerting device 230 are described below with respect to FIGS. 3B-3D.

Program storage server 240 may include a computing device, such as a server device or a collection of server devices. In some implementations, program storage server 240 may implement an API to generate a custom alerting program and/or program selection instructions that direct alerting device 230 to select a particular custom alerting program based on alert attributes. In some implementations, user device 210 may communicate with program storage server 240 (e.g., via a web portal or the like) to generate the custom alerting program via the API. In some implementations, program storage server 240 may store and/or provide the custom alerting program to a particular alerting device 230. In some implementations, program storage server 240 may store a custom alerting program formed by a third party developer to permit a user of alerting device 230 to download the custom alerting program to alerting device 230 in exchange for a payment.

Network 250 may include one or more wired and/or wireless networks. For example, network 250 may include a Bluetooth network, a near-field communication (NFC) network, an infrared network, a radio frequency (RF) network, a ZigBee network, a cellular network (e.g., a second generation (2G) network, a third generation (3G) network, a fourth generation (4G) network, a fifth generation (5G) network), or the like), a public land mobile network (PLMN), and/or another network. Additionally, or alternatively, network 250 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3A:
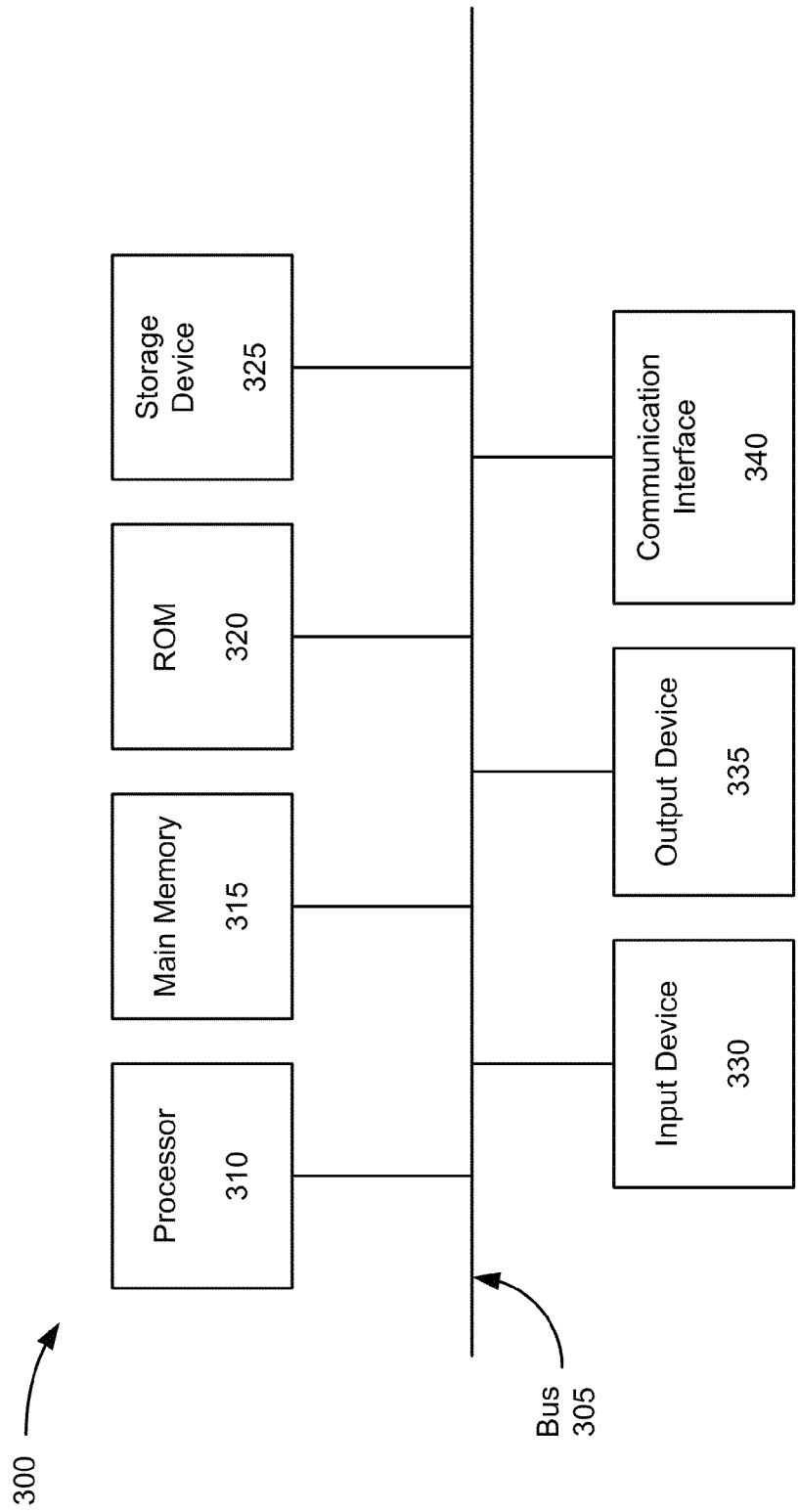
FIG. 3A illustrates example components of a device that may be used within the environment of FIG. 2.

FIG. 3A illustrates example components of a device 300 that may be used within environment 200 of FIG. 2. Device 300 may correspond to user device 210, client device 220, alerting device 230, and/or program storage server 240. Each of user device 210, client device 220, alerting device 230, and/or program storage server 240 may include one or more devices 300 and/or one or more components of device 300.

As shown in FIG. 3A, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as an LED, a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3A.

Figure 3B:
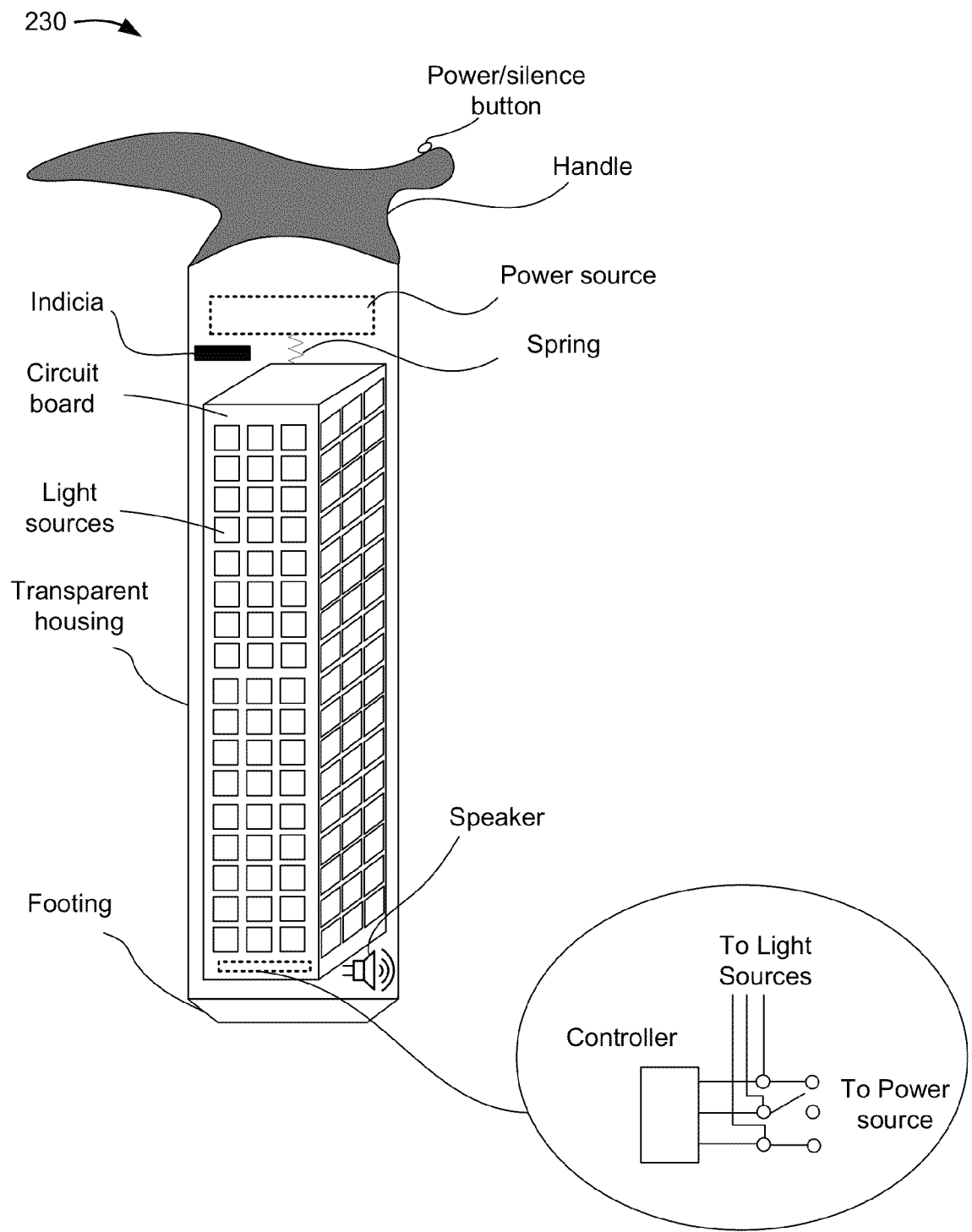
FIG. 3B illustrates example components of an alerting device.

FIG. 3B illustrates example components of an alerting device. As shown in FIG. 3B, alerting device 230 may be implemented as or within a walking aid, such as a cane, a hiking stick, or the like. In some implementations, alerting device 230 may be implemented as a novelty item, such as a sword, a light labor, a baton, or the like.

In some implementations, alerting device 230 may include a transparent housing, a footing provided at a bottom portion of the housing, and/or a handle provided on a top portion of the housing. In some implementations, alerting device 230 may include a power/silence button provided on the handle. In some implementations, the transparent housing may enclose a power source, a circuit board, and a spring connecting the power source to the circuit board. In some implementations, the circuit board may include multiple light sources, a speaker, a controller, and/or some other device (e.g., a sensor, an accelerometer, or the like).

In some implementations, the handle may include metal, wood, plastic, rubber, and/or some other type of material to provide a gripping point for a user to grip alerting device 230. In some implementations, the handle may be threaded and may attach to the transparent housing via threads at a connection point in the transparent housing. In some implementations, the handle may function as a top cover to the transparent housing and may apply a force to engage the power source against the spring connecting the power source to the circuit board.

As shown in FIG. 3B, the handle may include a power/silence button to power on or off alerting device 230. Additionally, or alternatively, the power/silence button may be used to cause alerting device 230 to discontinue executing a custom alerting program (e.g., such that alerting device 230 discontinues outputting audio and/or powering on and off light sources associated with alerting device 230). Additionally, or alternatively, the power/silence button may be used to connect alerting device 230 with user device 210 (e.g., to pair alerting device 230 with user device 210 via a Bluetooth connection, a near field connection, or the like). In some implementations, the power/silence button may connect with the circuit board via internal wiring connecting the power/silence button from the handle through the transparent housing and to the circuit board.

In some implementations, the footing may include a rubber and/or some other type of material provided at a bottom portion of the transparent housing. In some implementations, the footing may aid in gripping a walking surface and to aid a user in walking on the walking surface using alerting device 230.

In some implementations, the transparent housing may include a plastic, a plastic composite, a thermoplastic including a polymethyl methacrylate material, an acrylic glass, and/or some other type of material. In some implementations, the transparent housing may form a weather proof enclosure to protect components enclosed by the transparent housing. In some implementations, the transparent housing may be a shaft in the shape of a cylinder, a prism, or some other shape. In some implementations, the transparent housing may include a tint, a resin, and/or a coating to reduce an amount of light output by the light sources and passing through the transparent housing. Additionally, or alternatively, the tint and/or coating may alter a color and/or an intensity of light output by the light sources when the light passes through the transparent housing.

In some implementations, the transparent housing may include an indicia (e.g., an adhesive label, an engraved indicia, a radio frequency ID (RFID) tag, or the like) that may include a barcode, a quick response (QR) code, and/or some other type of indicia that identifies information associated with alerting device 230 (e.g., a model number, a serial number, etc.). In some implementations, user device 210 may scan the indicia to identify the particular alerting device 230 and to download an application used to create a custom alerting program for alerting device 230 based on a model number, serial number, and/or other identifier of alerting device 230 as identified by the indicia.

In some implementations, a power source may be provided within the transparent housing in between a bottom portion of the handle and engaged against a spring connecting the power source to the circuit board. In some implementations, the power source may be a portable power source, such as a battery (e.g., a lithium-ion battery, a nickel-metal hydride battery, an alkaline battery, and/or some other type of battery). In some implementations, the power source may be a non-portable power source that connects to a power supply in a facility.

In some implementations, a circuit board may be provided within the transparent housing and may connect multiple separate light sources (e.g., LEDs, florescent light bulbs, or the like) to a power source and to a controller. In some implementations, the circuit board may further include one or more speakers connected to the controller via the circuit board.

In some implementations, the circuit board may include a controller connected to switches that activate and/or deactivate the light sources. For example, a light source may be activated (e.g., powered on), when a corresponding switch is toggled to connect the light source to the power source. Further, a light source may be deactivated (e.g., powered off), when a corresponding switch is toggled to disconnect the light source from the power source. In some implementations, the circuit board may include a switch for each light source or may include a single switch for multiple light sources. In some implementations, the circuit board may include multiple switches, associated with different light colors, for a particular light source (e.g., to output different colors of light via the particular light source). In some implementations, the controller may toggle the switches in accordance with a custom alerting program that identifies particular light sources to activate/deactivate at particular time indexes. Further, the controller may output sound to the speaker in accordance with the custom alerting program.

In some implementations, alerting device 230 may include additional components, fewer components, different components, or differently arranged components than are shown in FIG. 3B. Further, the shapes, dimensions, and proportions of the components may differ from what is shown in FIG. 3B.

Figure 3D:
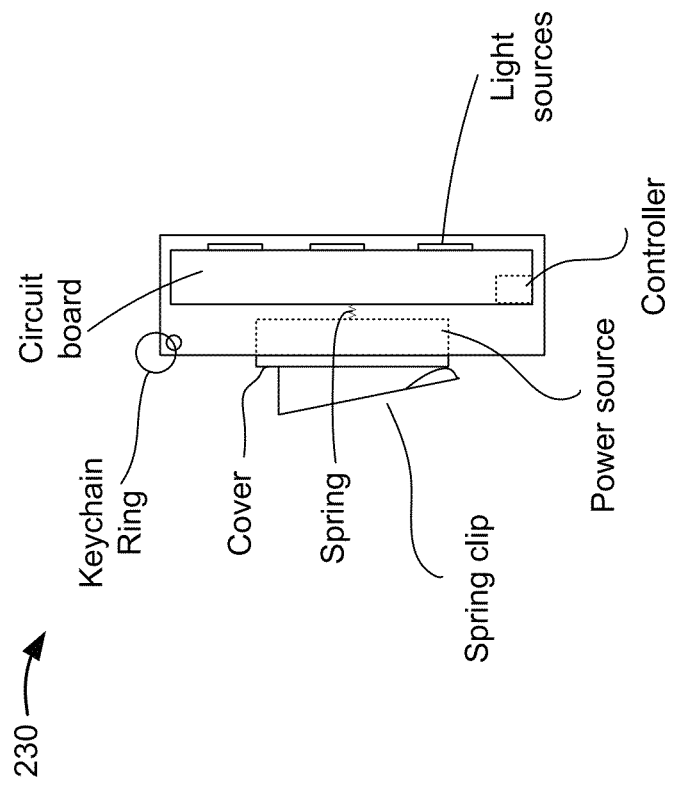
FIG. 3D illustrates a side view of the alerting device in FIG. 3C.
Figure 3C:
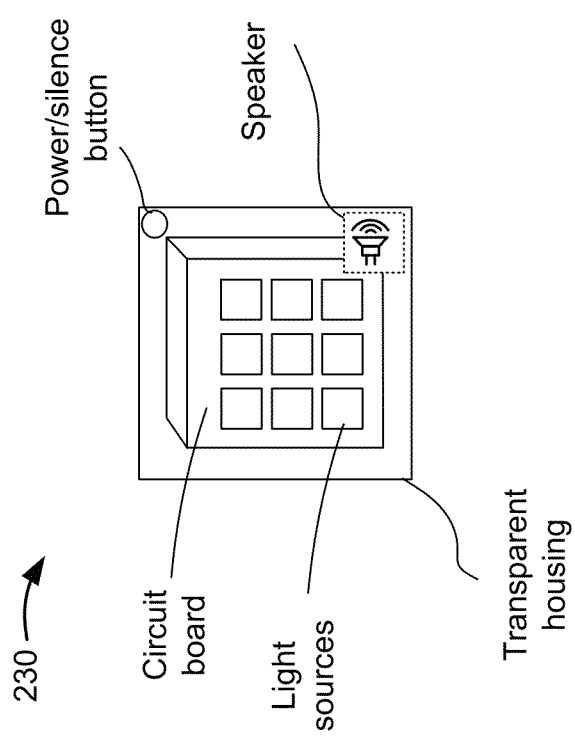
FIG. 3C illustrates example components of an alerting device.

FIG. 3C illustrates example components of an alerting device. FIG. 3D illustrates a side-view of the alerting device shown in FIG. 3C. As shown in FIGS. 3C-3D, alerting device 230 may be implemented as or within a keychain, a belt clip, or the like, and may be in the shape of a prism. For example, alerting device 230 may include a spring clip to attach to a belt. Additionally, or alternatively, alerting device 230 may include a keychain ring to attach to a key or keychain. In some implementations, alerting device 230 may include some other component, such as a stand such that alerting device 230 may be provided on a table or other surface.

In some implementations, alerting device 230 may include additional components, fewer components, different components, or differently arranged components than are shown in FIGS. 3C-3D. Further, the shapes, dimensions, and proportions of the components may differ from what is shown in FIGS. 3C-3D.

FIG. 4 illustrates an example data structure 400 that may be stored by one or more devices in environment 200, such as alerting device 230 and/or program storage server 240. In some implementations, data structure 400 may be stored in a memory of alerting device 230 and/or program storage server 240. In some implementations, data structure 400 may be stored in a memory separate from, but accessible by, alerting device 230 and/or program storage server 240. In some implementations, data structure 400 may be stored by some other device in environment 200, such as user device 210.

A particular instance of data structure 400 may contain different information and/or fields than another instance of data structure 400. In some implementations, a particular data structure 400 may store a particular custom alerting programs and program selection instructions for a particular alerting device 230.

As shown in FIG. 4, data structure 400 may include program instructions field 410 and program selection field 420.

Program instructions field 410 may include instructions for a particular custom alerting program. In some implementations, program instructions field 410 may store an identifier of the particular custom alerting program (e.g., a string of characters having any length and format that uniquely identifies the program). As further shown in FIG. 4, program instructions field 410 may identify a particular audio file that alerting device 230 may play (e.g., when alerting device 230 executes the custom alerting program) via a speaker and a particular volume level at which the audio file may be played. In some implementations, the particular audio file may be stored by alerting device 230. Additionally, or alternatively, alerting device 230 may download the particular audio file from a content storage server.

In some implementations, program instructions field 410 may include instructions to direct alerting device 230 to power on or power off particular light sources (e.g., particular LEDs) at a particular time index and in a particular sequence. Additionally, or alternatively, program instructions field 410 may include instructions to direct alerting device 230 to output a particular color of light via a particular LED. For example, alerting device 230 may output a particular color of light by toggling a switch, corresponding to the color of light, connecting a power source of alerting device 230 to the LED.

As an example, program instructions field 410 may store information to direct alerting device 230 to output blue light via LED 1, LED 2, and LED 3 at the time index of 0:01. Further, program instructions field 410 may store information to direct alerting device 230 to output red light via LED 1, LED 2, and LED 3 at the time index of 0:02. Further, program instructions field 410 may store information to direct alerting device 230 to power off LED 1 and LED 3, and to output blue light via LED 2 at time index 0:03. Further, program instructions field 410 may store information to direct alerting device 230 to output red light via LED 1 and LED 3, and to power off LED 2 at time index 0:04. In some implementations, alerting device 230 may execute program ID 1, thereby outputting sound and light in accordance with information stored by program instructions field 410. In some implementations, program instructions field 410 may store light output instructions for a program cycle (e.g., a cycle that includes time indexes 0:01-0:04) and alerting device 230 may repeat the program cycle until alerting device 230 receives an instruction to discontinue executing the custom alerting program or when a predetermined number of program cycles has completed.

Program selection field 420 may store information that identifies a particular custom alerting program that alerting device 230 may select and execute based on a set of alert attributes. For example, program selection field 420 may store attributes associated with an alert, such as type of alert (e.g., a telephone call, a text message, a sensor measurement, an alarm, etc.), a type of connection interface via which an alert is received (e.g., a Bluetooth interface, a cellular interface, etc.), a telephone number associated with the alert, a device ID associated with the alert, and/or some other information relating to an attribute of the alert. In some implementations, program selection field 420 may identify a particular custom alerting program that may be executed when an alert, meeting the corresponding alert attributes, is received. Further, program selection field 420 may identify a number of cycles in which the custom alerting program may be repeated. In some implementations, program selection field 420 may not identify the number of cycles (e.g., as indicated by "N/A") thereby directing alerting device 230 to continue to repeat execution of the custom alerting program until alerting device 230 receives a command to discontinue the custom alerting program.

As an example, alerting device 230 may execute the custom alerting program having the program ID 1 when alerting device 230 receives a telephone call type alert via a Bluetooth interface and when the alert is associated with the telephone number 555-555-1111. Further, alerting device 230 may repeat the custom alerting program five times, or when the execution of the custom alerting program is discontinued by a user of alerting device 230 (e.g., when a silence button is pressed on user device 210 and/or alerting device 230, when the telephone call is answered, etc.). In some implementations, alerting device 230 may determine the type of alert based on a header associated with the alert, based on a device ID of the alert, and/or based on service associated with the alert (e.g., a service that alerting device 230 may access to receive the alert, such as a service implemented by a Bluetooth profile of alerting device 230).

As another example, alerting device 230 may execute the custom alerting program having the program ID 3 when a resource level alert is received from a client device 220 having the device ID M2M123. For example, client device 220 may provide the alert when a resource level, measured by one or more sensors of client device 220, drops below a particular threshold or exceeds a particular threshold. As a result, alerting device 230 may be used to alert a user when client device 220 identifies that the resource level has dropped below a particular threshold or exceeded a particular threshold. Further, alerting device 230 may be used to alert the user when client device 220 identifies the occurrence of some other event (e.g., a facility intrusion event, an event relating to a temperature measurement that exceeds or drops below a particular threshold, an event relating to an inventory level for a product that exceeds or drops below a particular threshold, an event relating to a resource usage measurement that exceeds a particular threshold, etc.).

In some implementations, alerting device 230 may store alerts in a local storage corresponding to a time-based alarm. For example, program selection field 420 may store a program selection instruction to direct alerting device 230 to select and execute program ID 5 at a particular time of day corresponding to a time-based alarm. In some implementations, the time-based alarm may correspond to an event on a calendar associated with a user profile of a user associated with alerting device 230. Additionally, or alternatively, the time-based alarm may correspond to a recurring or one-time alarm set by the user of alerting device 230.

As described above, information stored by program instructions field 410 and/or program selection field 420 may correspond to custom alerting program instructions and program selection instructions selected by a user via an application of user device 210, alerting device 230, and/or program storage server 240. Some examples of selecting custom alerting program instructions and program selection instructions are described in greater detail below with respect to FIG. 5 and FIGS. 6A-6B.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
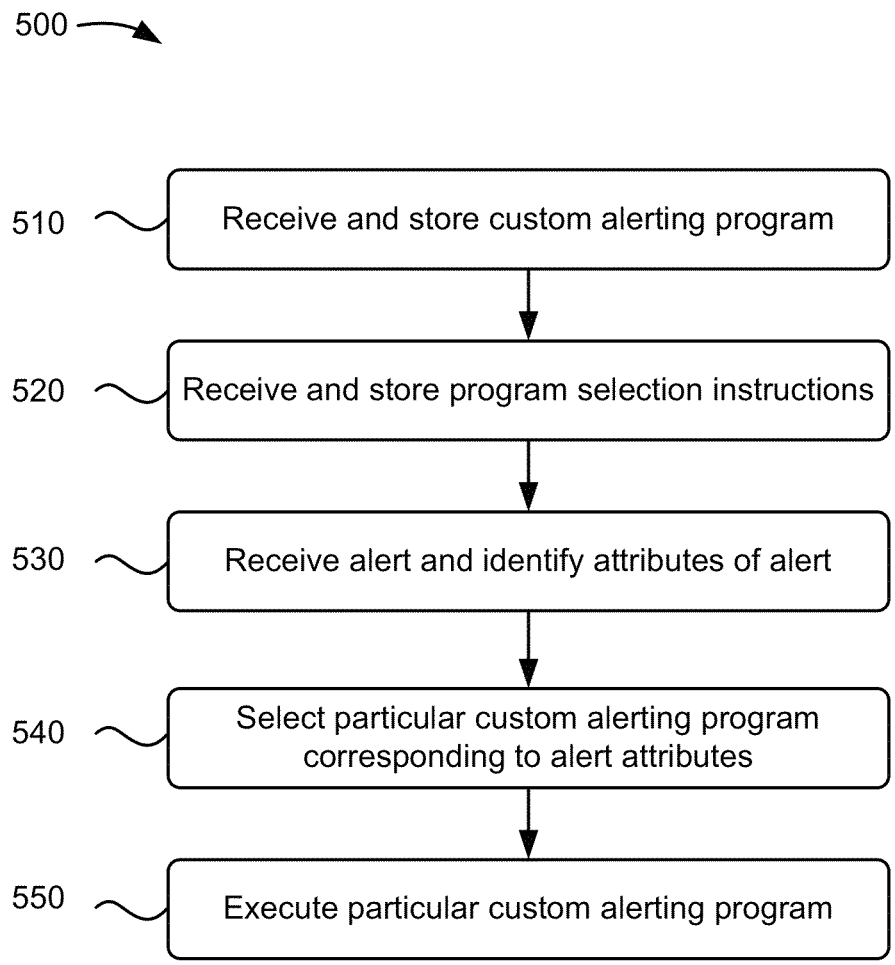
FIG. 5 illustrates a flowchart of an example process for executing a particular custom alerting program.

FIG. 5 illustrates a flowchart of an example process 500 for executing a particular custom alerting program. In one implementation, process 500 may be performed by one or more components of alerting device 230. In another implementation, some or all of blocks of process 500 may be performed by one or more components of another device in environment 200 (e.g., user device 210, client device 220, and/or program storage server 240), or a group of devices including or excluding alerting device 230, such as user device 210 in combination with alerting device 230.

As shown in FIG. 5, process 500 may include receiving and storing a custom alerting program (block 510). For example, alerting device 230 may receive the custom alerting program from user device 210 and/or from program storage server 240. As described above, the custom alerting program may be developed via an application associated with user device 210 and/or via an application associated with program storage server 240. In some implementations, alerting device 230 may include an application, to develop the custom alerting program, accessible by user device 210 when user device 210 connects with alerting device 230. In some implementations, the custom alerting program may include a script and/or a computer file having information corresponding to information stored by program instructions field 410 and may be stored in a memory of alerting device 230. In some implementations, the script and/or a computer file may be formed by the application associated with user device 210, program storage server 240, or alerting device 230. In some implementations, alerting device 230 may receive and store multiple custom alerting programs.

In some implementations, program storage server 240 may provide the custom alerting program to alerting device 230 based on receiving an instruction to provide the custom alerting program. For example, a user may use user device 210 to communicate with program storage server 240, to select the custom alerting program with a user interface of the user device, and to select to provide the custom alerting program to alerting device 230 (e.g., in an exchange for a payment or free of charge). Some examples of an application, to develop the custom alerting program, are described below with respect to FIGS. 6A-6B.

Process 500 may also include receiving and storing program selection instructions. For example, alerting device 230 may receive the program selection instructions from user device 210 via an application of user device 210 and/or via an application implemented on alerting device 230 and accessible by alerting device 230. In some implementations, the program selection instructions may correspond to information stored by program selection field 420 and may include instructions to direct alerting device 230 to select a particular custom alert, of multiple custom alerts stored by alerting device 230, based on attributes of an alert. In some implementations, the program selection instructions may be stored in a memory of alerting device 230 when alerting device 230 receives the program selection instructions. For example, user device 210 may provide a file including the program selection instructions to alerting device 230 for storage by alerting device 230. Additionally, or alternatively, alerting device 230 may generate the file when user device 210 is used to access the application implemented on alerting device 230 to provide the program selection instructions via the application.

Process 500 may further include receiving an alert and identifying attributes of the alert (block 530). For example, alerting device 230 may receive an alert from an alert provider, such as user device 210 and/or client device 220 (e.g., an incoming telephone call, an e-mail, a text message, an application alert, an alert relating to the occurrence of an event, such as a facility intrusion event, an event that identifies when resources have dropped below a particular threshold, and/or some other type of alert). As described above with respect to program selection field 420, the attributes of the alert (e.g., the alert attributes) may identify a type of alert, an interface via which the alert is received, a telephone number associated with the alert, a device ID of a device from which the alert is received, and/or some other information relating to the alert.

In some implementations, alerting device 230 may identify the attributes of the alert based on a header included in the alert. Additionally, or alternatively, alerting device 230 may identify the attributes based on a service via which the alert is received. For example, for a telephone call received by user device 210, the alert attributes may be received via a head-set service associated with a Bluetooth profile implemented by alerting device 230. For an alert in the form of an IP-based message received from client device 220, the alert attributes may be included in a header of a packet associated with the alert.

Process 500 may also include selecting a particular custom alerting program corresponding to the alert attributes (block 540). For example, alerting device 230 may identify the particular custom alerting program based on information stored by program selection field 420 and based on the alert attributes. Some examples of selecting a particular custom alerting program are described above with respect to program selection field 420. In some implementations, alerting device 230 may select a default custom alerting program when the alert attributes do not match the attributes identified by the program selection instructions. In some implementations (e.g., when alerting device 230 stores only one custom alerting program), alerting device 230 may select the one custom alerting program. In some implementations, user device 210 may identify alert attributes, may select the particular custom alerting program based on the program selection instructions, and may provide a message to alerting device 230 that identifies the selected particular custom alerting program.

Process 500 may further include executing the particular custom alerting program (block 550). For example, alerting device 230 may execute the particular custom alerting program to activate or deactivate particular light sources of alerting device 230 in a particular sequence and/or to output audio via a speaker of alerting device 230. In some implementations, alerting device 230 may complete a program cycle after executing the particular custom alerting for a predetermined amount of time or for a predetermined number of cycles. As described above with respect to program instructions field 410, the particular custom alerting program may identify the time length of the program cycle. For example, the particular custom alerting program may have a 5 second program cycle when the particular custom alerting program includes instructions for time indexes spanning from 0:00-0:05. In some implementations, alerting device 230 may discontinue executing the particular custom alerting program after completing a particular number of program cycles and/or receiving an instruction to discontinue executing the particular custom alerting program. In some implementations, the particular number of program cycles may be based on program selection instructions stored by program selection field 420.

In some implementations, alerting device 230 may execute a custom alerting program based on a time-based alarm that may correspond to an event stored by a user's calendar or a user profile. For example, alerting device 230 may store the user's calendar or may receive an indication from user device 210 or from some other device to execute the custom alerting program at a time corresponding to the calendar event. In some implementations, user device 210 may provide a one-time instruction to direct alerting device 230 to execute a custom alerting program.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6A:
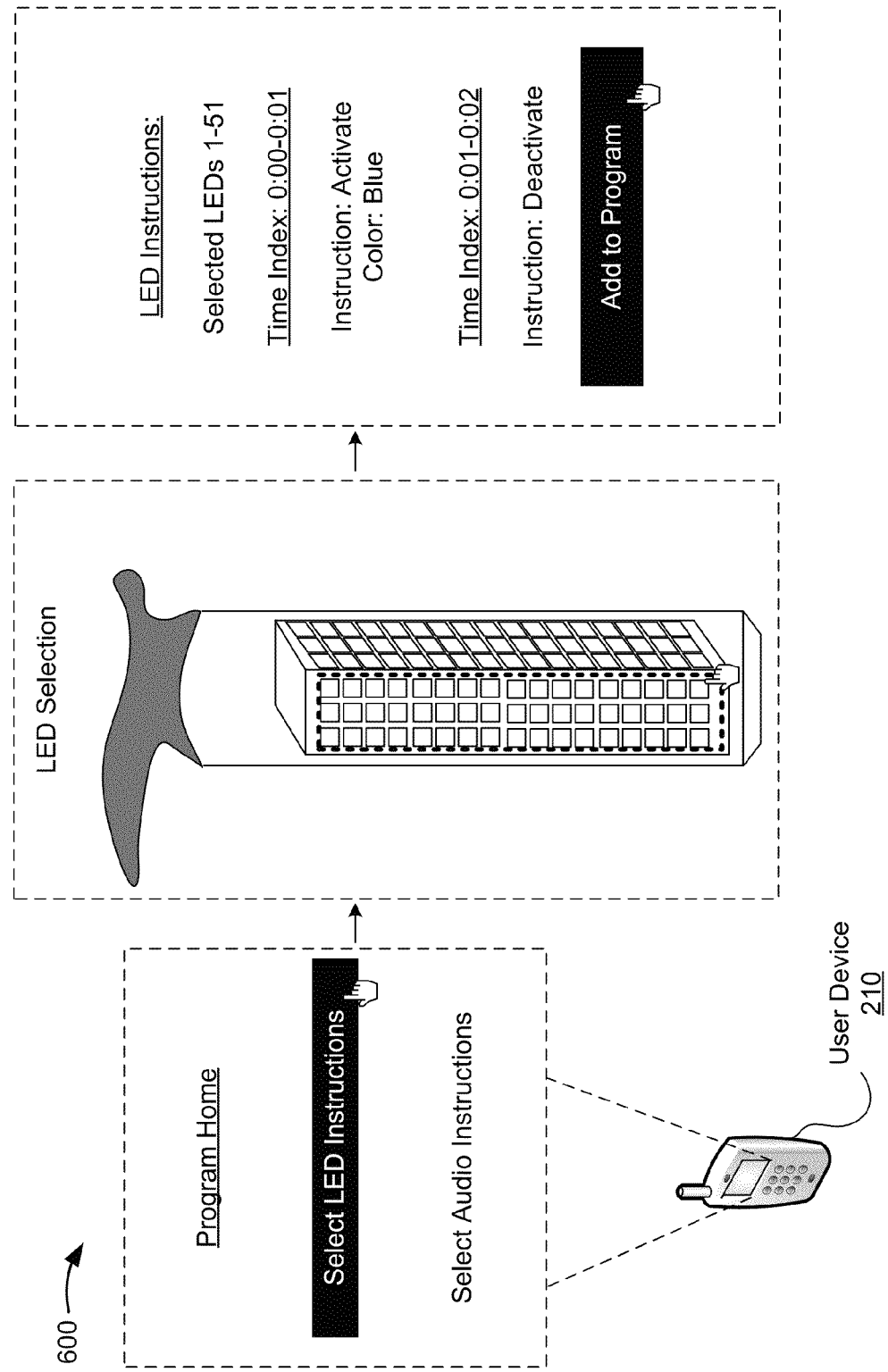
FIGS. 6A-6B illustrate an example implementation as described herein.
Figure 6B:
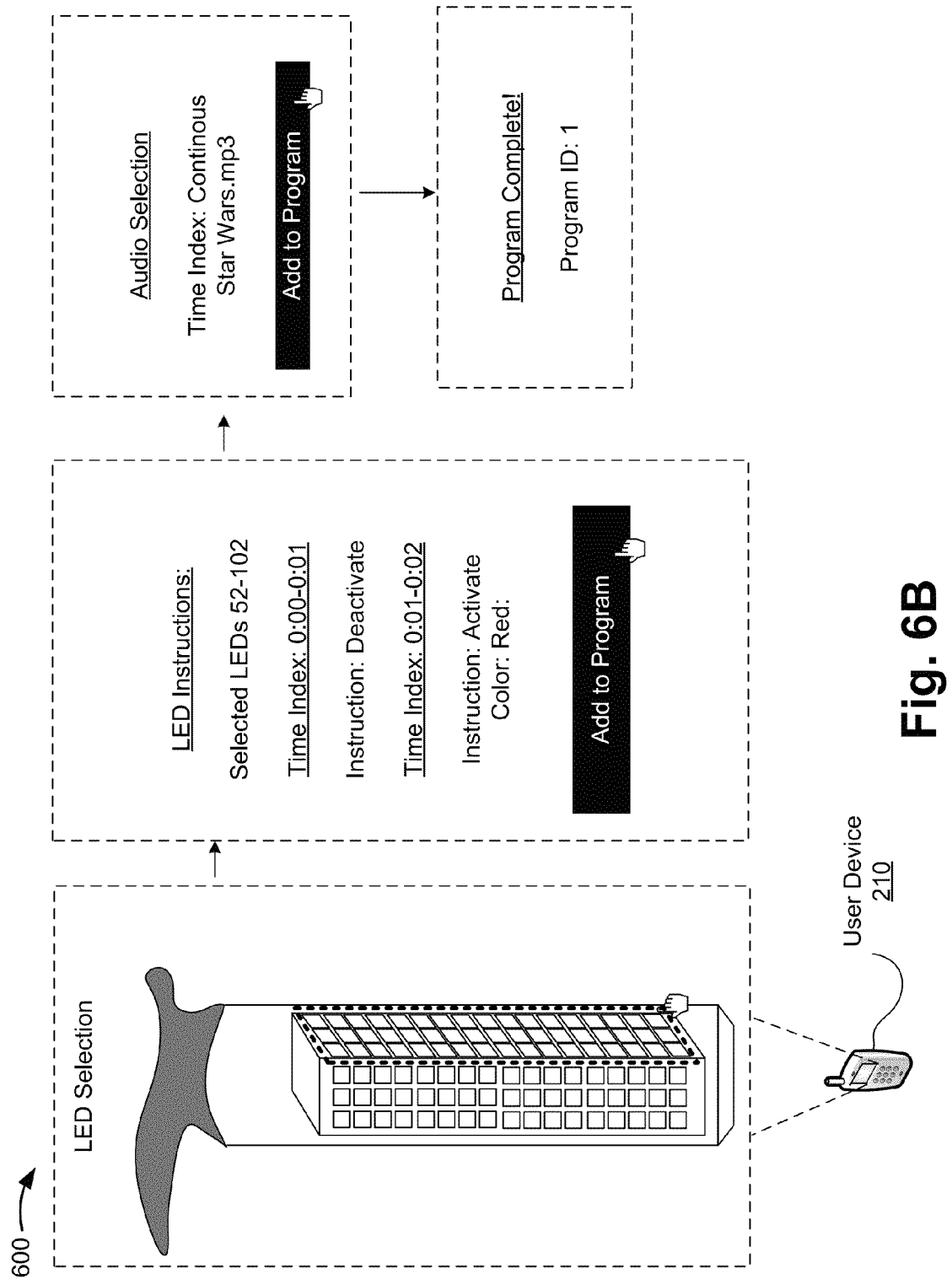

FIGS. 6A-6B illustrate an example implementation as described herein. As shown in FIG. 6A, user device 210 may execute an application, as shown in interface 600, to allow a user to provide instructions used to develop a custom alerting program for alerting device 230. In some implementations, the application shown in interface 600 may be implemented within alerting device 230 and accessible by user device 210. Additionally, or alternatively, the application may be implemented by program storage server 240 and accessible by user device 210 via a web portal or via some other technique.

In some implementations, a user may use a camera or scanning device, associated with user device 210, to scan indicia on alerting device 230. Based on scanning the indicia, user device 210 may identify a layout of light sources associated with alerting device 230 (e.g., based on a serial number of alerting device 230, a model number of alerting device 230, or some other identifier of alerting device 230 corresponding to the indicia scanned by user device 210). Additionally, or alternatively, user device 210 may receive an identifier of alerting device 230 via some other technique (e.g., manual entry) to identify alerting device 230 and identify a layout of the light sources associated with alerting device 230. As an example, assume that alerting device 230 corresponds to a walking aid, such as a cane, a hiking stick, or the like.

In some implementations, the custom alerting program may include a light source instruction set and an audio instruction set. For example, the light source instruction set may direct alerting device 230 to power on/power off particular light sources on alerting device 230, modify an intensity of the light sources, and/or modify a color output by the light sources at different time indexes. In some implementations, the audio instruction set may direct alerting device 230 to output particular audio at particular time indexes or to output particular audio for the entire time that alerting device 230 executes the custom alerting program.

As shown in FIG. 6A, a layout of the light sources may be presented in interface 600 when a user selects to provide instructions for the light source instruction set (e.g., instructions for LED light sources associated with alerting device 230). As further shown in interface 600, the user may select a particular light source or a particular group of light sources. Based on selecting the light source(s), the user may select instructions for the selected light source(s) that may be executed at particular time indexes. As an example, the user may select to activate (e.g., power on) the selected light sources (e.g., LEDs 1 through 51) and output the color blue during the time index 0:00-0:01. Further, the user may select to deactivate (e.g., power off) the selected light sources from time index 0:01-0:02. As further shown in interface 600, the user may select to add the instructions for the light sources to a custom alerting program.

Referring to FIG. 6B, the user may further select to generate instructions for another group of selected light sources (e.g., LEDs 52 through 102). In the example shown in FIG. 6B, the user may select to deactivate the selected light sources during time index 0:00-0:01, to activate the selected light sources during time index 0:01-0:02, to output the color red via the selected light sources. As further shown in FIG. 6B, the user may select to add the instructions to the custom alerting program. In some implementations, the instructions received via interface 600 may correspond to custom alerting program instructions stored by program instructions field 410. As further shown in FIG. 6B, the user may select to provide instructions for the audio instruction set of the custom alerting program. As an example, the user may select a particular audio file that alerting device 230 may output when executing the custom alerting program (e.g., the audio file "Star Wars.mp3"). Further, the user may select time indexes in which the audio file is to be output. For example, the user may select to direct alerting device 230 to continuously output the audio file as the custom alerting program is executed over multiple program cycles.

In the example of FIG. 6A-6B, a program cycle may be two seconds in length (e.g., since instructions were received for time indexes spanning from 0:00-0:02). In some implementations, user device 210, alerting device 230, and/or program storage server 240 may generate the custom alerting based on receiving instructions for the custom alerting program via interface 600. In some implementations, interface 600 may present an indication that the custom alerting program has been created (e.g., when the user selects to create the custom alerting program after providing instructions for the light source instruction set and the audio instruction set). In some implementations, interface 600 may present an option to allow the user to provide a description, name, or identifier to uniquely identify the program. In some implementations, the description, name, or identifier may correspond to the program ID stored by program instructions field 410.

While a particular example is shown in FIGS. 6A-6B, the above description is merely an example implementation. In practice, other examples are possible from what is described above in FIGS. 6A-6B. Also, while a particular format of interface 600 is shown, in practice, interface 600 may have a different format and appearance than what is shown in FIG. 6.

Figure 7:
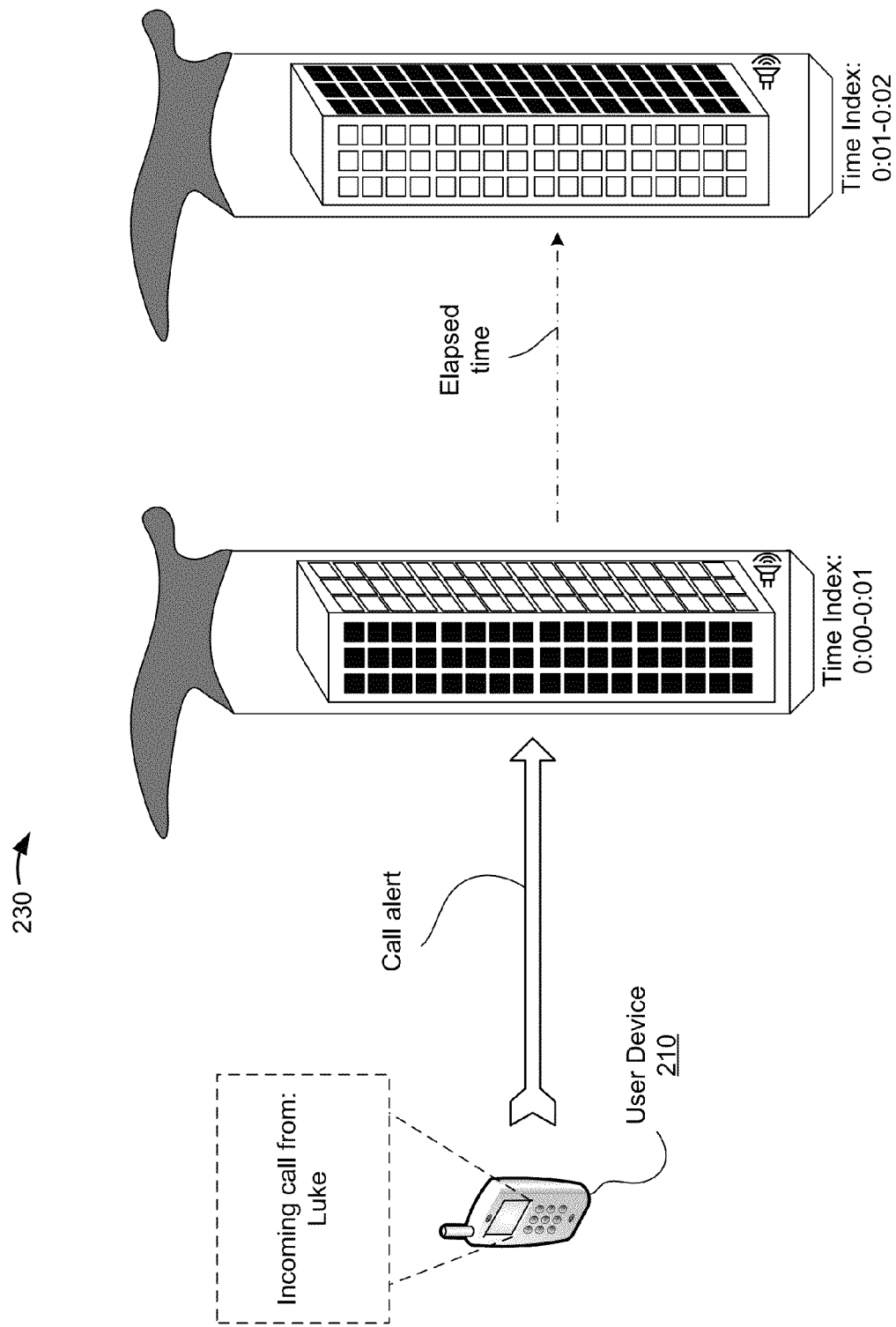
FIG. 7 illustrates an example implementation as described herein.

FIG. 7 illustrates an example implementation as described herein. In FIG. 7, assume that user device 210 is connected to alerting device 230 and that alerting device 230 stores one or more custom alerting programs. Further, assume that user device 210 receives a telephone call and that user device 210 provides an alert relating to the call (e.g., via a particular service, such as a Bluetooth service, or the like). Given these assumptions, alerting device 230 may receive the alert, identify the alert attributes, select a particular custom alerting program, and execute the particular alerting program (e.g., in accordance with process 500 above). In FIG. 7, assume that the custom alerting program directs alerting device 230 to power on a first group of light sources during the time index 0:00-0:01, power off the first group of light sources during the time index 0:01-0:02, and power on a second group of light sources during the time index 0:01-0:02. Given these assumptions, alerting device 230 may power on the first group of light sources during the time index 0:00-0:01, power off the first group of light sources during the time index 0:01-0:02, and power on the second group of light sources during the time index 0:01-0:02 as shown in FIG. 7 to complete a program cycle. Further, alerting device 230 may repeat the program cycle, thereby creating an animation effect when executing the custom alerting program.

While a particular example is shown in FIG. 7, the above description is merely an example implementation. In practice, other examples are possible from what is described above in FIG. 7.

As described above, a custom alerting program may include a program cycle that identifies particular light sources, associated with alerting device 230, to activate, particular time indexes during which to activate the particular light sources, a color/intensity of light output by the light sources, particular audio to output at the particular time indexes, and/or some other instruction for alerting device 230. In some implementations, different custom alerting programs may be selected based on attributes associated with the alert provided by the alert provider. That is, alerting device 230 may store multiple custom alerting programs and may select a particular custom alerting program to execute based on attributes of the alert, thereby creating a personalized and customized experience when receiving an alert.

In some implementations, user device 210 may communicate wirelessly with an alerting device 230 that indicates proximity. For example, alerting device 230 may illuminate when a vehicle in a garage comes within a predetermined distance from the alerting device. In some implementations, alerting device 230 may include a sensor that detects the proximity of the vehicle, or other object, and illuminates as described elsewhere herein, and also transmits an alert message to user device 210, and/or an audible and visual indicator in the vehicle that also alerts a driver of proximity to the alerting device. Thus, by strategically placing alerting device 230 in the garage, the driver can receive parking guidance without having a park-distance feature built into the vehicle.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Some implementations are described herein in conjunction with thresholds. The term "greater than" (or similar terms), as used herein to describe a relationship of a value to a threshold, may be used interchangeably with the term "greater than or equal" (or similar terms). Similarly, the term "less than" (or similar terms), as used herein to describe a relationship of a value to a threshold, may be used interchangeably with the term "less than or equal to" (or similar terms). As used herein. "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A system comprising:
 a first device to:
  receive an alert from a second device; and
  execute, based on receiving the alert, a particular alerting program, of a plurality of alerting programs, to activate or deactivate a plurality of separate light sources, implemented within the first device, in a sequence in accordance with instructions included in the particular alerting program,
   the instructions being selected or customizable by a user via an application associated with the first device, the first device being separate from the second device,
the first device including a handle connected to a first portion of a transparent housing and a footing connected to a second portion of the transparent housing,
the transparent housing including a circuit connecting the plurality of separate light sources.

2. The system of claim 1, where the first device is further to:
identify attributes associated with the alert; and
select the particular alerting program based on the attributes,
where when executing the particular alerting program, the first device is further to execute the particular alerting program based on selecting the particular alerting program.

3. The system of claim 1, where the alert includes an indication of a telephone call, an e-mail, or a text message being received by the second device.

4. The system of claim 1, where the alert relates to data gathered or processed by the second device,
the second device being a machine-to-machine device.

5. The system of claim 1, where when executing the particular alerting program, the first device is further to modify an intensity or color of light output by one or more of the plurality of separate light sources.

6. The system of claim 1, where when executing the particular alerting program, the first device is further to display a particular pattern or animation via light output by one or more of the plurality of separate light sources.

7. The system of claim 1, where the first device is further to:
receive an instruction to discontinue the execution of the particular alerting program via a button included on the handle; and
discontinue the execution of the particular alerting program based on receiving the instruction via the button.

8. A method comprising:
receiving, by a first device, an alert from a second device; and
executing, by the first device and based on receiving the alert, a particular alerting program, of a plurality of alerting programs, to activate or deactivate a plurality of separate light sources, implemented within the first device, in a sequence in accordance with instructions included in the particular alerting program,
the instructions being selected or customizable by a user via an application associated with the first device,
the first device being separate from the second device,
the first device including a handle connected to a first portion of a transparent housing and a footing connected to a second portion of the transparent housing, and
the transparent housing enclosing a circuit connecting the plurality of separate lighting sources.

9. The method of claim 8, further comprising:
identifying attributes associated with the alert; and
selecting the particular alerting program based on the attributes,
where executing the particular alerting program is based on selecting the particular alerting program.

10. The method of claim 8, where the alert includes an indication of a telephone call, an e-mail, or a text message being received by the second device.

11. The method of claim 8, where the alert relates to data gathered or processed by the second device,
the second device being a machine-to-machine device.

12. The method of claim 8, where executing the particular alerting program includes modifying an intensity or color of light output by one or more of the plurality of separate light sources.

13. The method of claim 8, where executing the particular alerting program includes executing the particular alerting program at a time corresponding to a calendar event or alarm associated with a user.

14. The method of claim 8, where executing the particular alerting program includes outputting particular sound.

15. The method of claim 8, where the first device is at least one of a cane or a walking stick.

16. A non-transitory computer-readable medium for storing instructions, the instructions comprising:
a plurality of instructions which, when executed by one or more processors associated with a first device, cause the one or more processors to:
receive an alert from a second device;
identify attributes associated with the alert;
select a particular alerting program, of a plurality of alerting programs, based on the attributes; and
execute, based on receiving the alert, the particular alerting program, based on selecting the particular alerting program, to activate or deactivate a plurality of separate light sources, implemented within the first device, in a sequence in accordance with instructions included in the particular alerting program,
the instructions being selected or customizable by a user via an application associated with the first device,
the first device being separate from the second device,
the first device including a handle connected to a first portion of a transparent housing and a footing connected to a second portion of the transparent housing, and
the transparent housing enclosing a circuit connecting the plurality of separate lighting sources.

17. The non-transitory computer-readable medium of claim 16, where the alert includes an indication of a telephone call, an e-mail, or a text message being received by the second device.

18. The non transitory computer-readable medium of claim 16, where the alert relates to data gathered or processed by the second device,
the second device being a machine-to-machine device.

19. The non-transitory computer-readable medium of claim 16, where one or more instructions, of the plurality of instructions, to execute the particular alerting program, further cause the one or more processors to display a particular pattern or animation via light output by one or more of the plurality of separate light sources.

20. The non-transitory computer-readable medium of claim 16, where the first portion is a first end of the transparent housing and the second portion is a second end of the transparent housing, and
where the transparent housing includes a shaft enclosing the circuit.

* * * * *